United States Patent Office 3,212,091
Patented Oct. 12, 1965

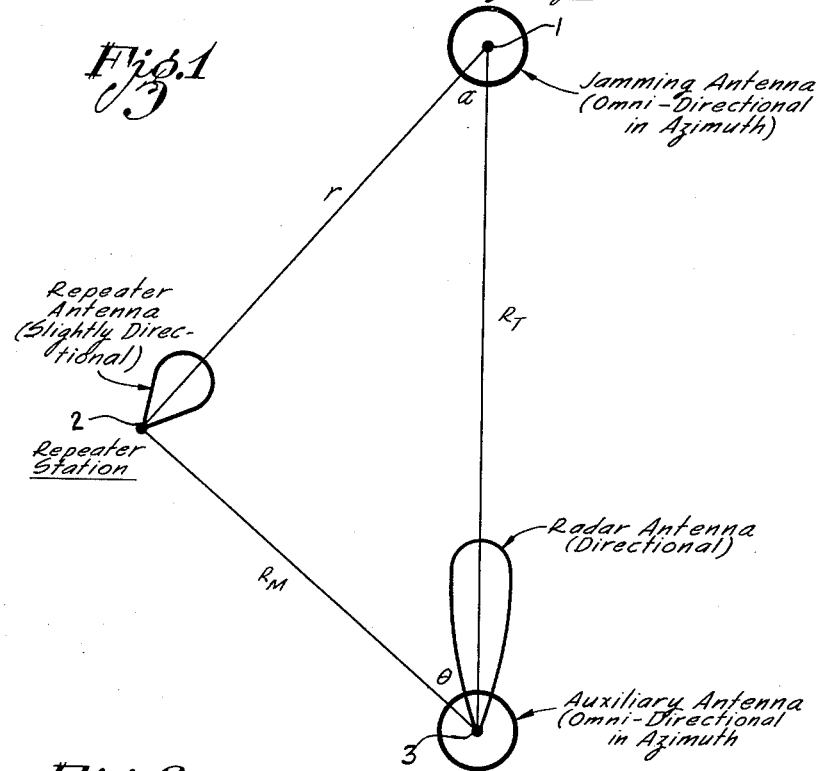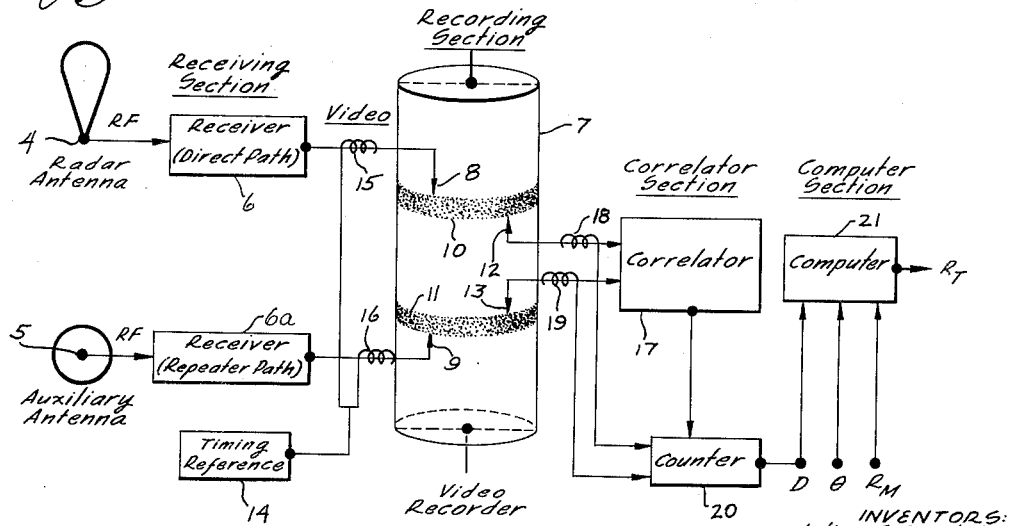

3,212,091
POSITION DETERMINING SYSTEM
Thomas B. Bissett, Redondo Beach, Arnost A. Horak, Pacific Palisades, and Julius S. Bendat, Los Angeles, Calif., assignors, by mesne assignments, to TRW Inc., a corporation of Ohio
Filed Jan. 17, 1957, Ser. No. 634,792
13 Claims. (Cl. 343—112)

This invention relates to a position determining system, and more particularly to such a system as will determine the bearing and range of an energy radiating source from a given station.

An existing system for determining the range and bearing of a source of radiating energy utilizes a pair of geographically separated stations to determine the direction of the source from each station. By use of triangulation techniques, the range and bearing of the source from the station can then be determined. However, this direction finding technique suffers from severe limitations. It is costly and rather slow in operation, since each of the two stations must accurately determine the direction of the energy radiating source. Moreover, there must be a coordinated communication link between the two stations since both stations must simultaneously aim their directional antennas at a single radiation source. Further, if several energy radiating sources are present, a triangulation system such as the foregoing will indicate non-existent radiating sources. Confusion occurs because the system measures only directions and depends upon the intersections of the direction lines from the two stations to determine the source location. Where several sources exist, there are crossings between the direction lines which do not correspond to real sources. Consequently, additional stations must be used to discriminate between real and apparent sources.

The position determining system herein disclosed does not suffer from any of the foregoing difficulties of a triangulation system since it determines the bearing and range of a radiating source by measurements and computations performed at only one station, the other station being completely passive. Also, if many radiation sources are present, no apparent or false sources will be indicated. Nor need there be any coordination between the two stations of the present system in order that two or more directional antennas may be simultaneously aimed at a single radiation source selected from among many, since one of the stations can be non-directional, and since the technique of this invention isolates the selected radiation source for the required measurement.

It is therefore, one object of this invention to provide a low cost position determining system which can determine the bearing and range of an energy radiating source extremely rapidly.

It is a further object of this invention to provide a position determining system for indicating the range and bearing of a radiation source, in which no apparent or false radiation sources are indicated.

It is a still further object of this invention to determine the bearing and range of a radiating source by utilizing two stations, one of which is completely passive, with the measurements and computations being performed only at the other station.

It is still another object of this invention to provide a pair of stations for measuring the range and bearing of a radiating source in which one of the stations can be non-directional.

Other objects and advantages will appear as the description of the invention proceeds.

In accordance with the invention, first and second stations, located at respectively different points of position and separated by a known distance, are provided for receiving energy from an energy source located at a third point of position, the range and direction of the energy source relative to the position of the second station it is desired to measure. The first station may be non-directional and it serves to re-transmit energy from the source to the second station. Thus energy from the source arrives at the second station along two paths, one directly from the source and the other through the first station. The second station is a directional one, and is provided with means for developing a data signal representing the bearing angle between a line joining it to the first station and a line joining its position to the position of the energy source. At the second station, the energy received from the first station and the source is recorded and correlated to develop a data signal representing the time difference between the time it took the energy coming directly from the source to reach the second station and the time required for the energy to travel from the source through the first station to the second station. This time difference is, of course, directly proportional to the difference in distance between the two paths taken by the energy. It is only by means of this value of distance difference that it becomes possible to mathematically calculate without ambiguity the actual range distance between the second station and the energy source. Data signals representing the bearing angle, the known distance between the two stations, and the above value of distance difference are applied to a computer programmed to perform this calculation function. The output from the computer will then comprise a signal representing the distance or range of the source relative to the second station.

The system of this invention outlined above will fulfill all of the foregoing noted objects, and has the additional advantage of being able to obtain the range and bearing of the source when the source is transmitting jamming signals which would normally hide its position from a radar set at the second station, since the jamming signals themselves are utilized to determine the position of their source.

The features of the invention which are believed to be novel and patentable are pointed out in the claims which form a part of this specification; for a better understanding of the invention, reference is made in the following description to the accompanying drawings, wherein like parts are indicated by like reference numerals, in which:

FIG. 1 is a sketch illustrating the geometry involved in making the calculations required by the present system; and FIG. 2 is a block diagram, partially in perspective, of the receiving, recording, correlating, and computing sections disposed at the second station of the system.

Referring now to FIG. 1, there is shown a source of energy 1, which may produce electromagnetic or sound waves, and the bearing and range of which it is desired to measure. This energy source is labeled Jamming Target, since it is contemplated that the present system will have its most immediate application in connection with the location of such targets. As noted in connection with this source, the jamming target has an antenna pattern with a generally circular, omni-directional pattern in azimuth. Source 1 transmits its energy along a path labeled $r$ to a station 2, and also along a path labeled $R_T$ to another station 3. Station 2 is labeled Repeater Station since its purpose is to take the energy received from source 1 and re-transmit it along a path $R_M$ to station 3. The antenna pattern of station 2 is indicated as being slightly directional, in order to obtain improved reception from source 1, although it may also be omni-directional. The angle between paths $R_M$ and $R_T$ is the bearing angle that it is desired to measure, and it is labeled $\theta$.

At station 3, as indicated in the figure, a directional radar antenna serves to determine the direction of path $R_T$, while an auxiliary antenna which may be omnidirectional in its response serves to receive energy retransmitted by station 2 along path $R_M$. It will be obvious from this figure that since $R_M$ is either known or can be readily determined by the radar antenna at station 2, that $\theta$ can also be determined by turning the radar antenna first toward station 2 and then toward source 1, and that $R_T$ (the range or distance from station 3 to the jamming signal source 1) is the only quantity that is in doubt.

It is possible to show mathematically that $R_T$ can be calculated from the known quantities noted above. We first utilize the law of cosines, which states that in a triangle the square of one of the sides is equal to the sum of the squares of the other two sides minus twice the product of the other two sides times the cosine of the angle opposite the one side. Applying the law of cosines to FIG. 1, we derive the following formula:

$$r^2 = R_T^2 + R_M^2 - 2R_M R_T \cos \theta \quad (1)$$

It will be seen from FIG. 1 that the energy path taken by the energy from source 1 through station 2 to station 3, less the direct energy path length between source 1 and station 3 is equal to:

$$D = (R_M + r) - R_T \quad (2)$$

From equations (1) and (2) it is possible to derive the following equation for the direct path between source 1 and station 3:

$$R_T = \frac{D(R_M - D/2)}{D - R_M(1 - \cos \theta)} \quad (3)$$

As Equation (3) demonstrates, if D, $R_M$ and $\theta$ are known, it is possible to calculate $R_T$, and this is the range from station 3 to source 1. Since as previously noted, $\theta$ can be determined by the directional radar antenna at station 3, and since $R_M$ is either a constant or can also be determined by the directional radar antenna, only a determination of D need be made. In this connection it will be noted that although Equation 1 is quadratic in form, thereby permitting of two possible different values of $R_T$ in satisfying Equation 1, determination of $d$ as defined in Equation 2 uniquely determines which one of the two possible values of $R_T$ represents the actual physical length of path $R_T$ under any given condition. That is, for each of the two possible values of $R_T$ permitted by Equation 1, there is only one possible value of D, as defined by Equation 2, since the value of D for each of the two possible values of $R_T$ is uniquely different. In other words, determination of $R_T$ by Equation 1 leads to possible ambiguity. However, by using Equation 3, which in accordance with the present invention takes into account the value D defined by Equation 2, $R_T$ is uniquely defined under any given condition. Thus in accordance with the present invention, means are provided for determining the value D under conditions typified by the arrangement depicted in FIG. 1, one preferred arrangement for determining the value D being shown in FIG. 2.

Referring now to FIG. 2, there is shown those elements of the equipment present at station 3 of FIG. 1 which are useful in understanding the present invention. This equipment includes a directional radar antenna 4 and an auxiliary antenna 5 which may be omni-directional, as previously noted in connection with FIG. 1. Antenna 4 may be rotatable in azimuth for scanning purposes and be part of an ordinary radar set. The signals radiated from a source of R.F. noise whose range and bearing it is desired to calculate are received by antenna 4 and fed into a radar receiver 6, this receiver receiving the R.F. signals along the direction path $R_T$ of FIG. 1. Within receiver 6 the R.F. signals are demodulated and samples thereof recorded as video signals upon a recording device such as a magnetic video recorder having a magnetic drum 7 upon which may be defined a plurality of closed loop recording means such as magnetic tracks 10 and 11.

The R.F. signals from station 2 of FIG. 1 are received at antenna 5, are also demodulated within a receiver 6a, and are then impressed as video signals upon magnetic video drum 7.

By means of a pair of recording heads 8 and 9, the signals received by antennas 4 and 5 are magnetically recorded on two separate respective magnetic tracks 10 and 11 of drum 7. Pickup heads 12 and 13 respectively pick off the signals from paths 10 and 11, one of these heads being physically displaceable from the other so that a time delay is introduced between the two signals so picked off. A timing reference device 14, which may comprise a source of periodically recurrent reference signal, acting through coils 15 and 16 places suitable magnetic timing marks upon the respective tracks 10 and 11 so that the signals may, in a rather unique way, be time referenced. The signals from heads 12 and 13 are both fed into a correlator 17, and a pair of coils 18 and 19 also feed the timing signals into a counter 20.

Correlator 17 multiplies together the two signal sets fed into it, and averages the product over a predetermined period of time to produce a product signal. By moving heads 12 and 13 relative to one another until the value of the product signal becomes a maximum, indicating that the mutually coherent components in recorded signals are in time coincidence, the delay introduced by heads 12 and 13 now will be directly proportional to the difference between the two paths taken by the signals from source 1. Counter 20 measures the difference between the timing reference signals between heads 12 and 13 on paths 10 and 11 to measure the foregoing delay, and it is so connected to correlator 17 so that it will only produce an output when the output of correlator 17 is a maximum. Since a sharp maximum will only be obtained when identical signals are matched in time by the correlator, no false sources can be indicated and only signals from the same source will cause a significant output from the correlator to be produced. The time difference between the two recorded signals is directly proportional to D, and it is fed into a computer 15. Also fed into the computer, is data from the radar antenna 4 representing $\theta$ and also data representing $R_M$. The output signal from computer 20 will therefore be, as indicated, representative of the path length $R_T$, and this is the distance between source 1 and station 3 that it is desired to determine.

In operation, radar antenna 4 is rotated between lines $R_M$ and $R_T$ to determine the angle $\theta$. Then radar antenna 4 is pointed directly at source 1 and the displacement between heads 12 and 13 is varied until the output from correlator 17 is a maximum. Whereupon, counter 20 will provide an output representative of the value D. Now computer 21 will give an output in turn representative of the desired unknown quantity $R_T$. It will be obvious that $R_T$ and $\theta$ provide the bearing and distance information that it is the main object of this invention to determine.

The entire system of the invention has been shown in block diagram form because the component parts thereof are all well known in the art, although their interconnection and operative relationship are considered novel. Suitable directional and omni-directional antennas, radars, and receivers are in common use and so nothing further will be said concerning these elements. With respect to the recording and correlation sections of the apparatus shown in FIG. 2, this type of equipment is also well known and one example thereof is depicted and described in a report published by the Office of Naval Research, Technical Report No. 144, by R. A. Johnson of Cruft Laboratory, Harvard University, Cambridge, Massachusetts, March 25, 1952, and entitled "An Analog Computer for Correlation Functions in Communication Systems." Other such correlators have been extensively described in literature and so this apparatus will not be discussed further here.

Insofar as computer 21 is concerned, a suitable piece of apparatus would be the Digitac computer manufactured by the Hughes Aircraft Company, and other suitable computers are also commercially available.

It should be understood that the antenna at repeater station 2 of FIG. 1 and the antenna 5 of FIG. 2 may be either omni-directional or directional without changing the inventive concept involved, provided only that they perform their intended operation of receiving signals from source 1 as described above. Moreover, many types of radars could be used in connection with this invention, and indeed, the present system is intended to be used in conjunction with a conventional radar system, only a repeater station and auxiliary antenna at the radar station being necessary, in addition to the recorder, correlator and computer. Further, it will be obvious that although the time measuring means shown in FIG. 2 is of its nature a particularly novel and useful way of measuring signal delay by correlation techniques, other time measuring means, correlators and recorders, aside from the ones illustrated, could be used without destroying the individual concept provided only that they enable the operator of the system to measure the time difference between the two messages received at the radar station.

It should be noted that the system outlined above may have other uses in addition to locating the range and bearing of a noise emitting source. For example, it could be adapted to act as a novel means of identifying friendly or unfriendly aircraft. Thus, if random noise signals were recorded and issued to friendly craft to be emitted by them, and the same recording were present as a standard at the radar station, the correlator, in addition to finding the difference between a pair of signal paths, could also match the received signals with the standard and distinguish between friendly and unfriendly jamming. Such a system would make it possible to provide a theoretically infinite number of discrete and secure codes for aircraft identification, and obviously would be extremely advantageous to the military.

While there has been described what is at present considered a preferred embodiment of the invention, it will be obvious to those skilled in the art that various changes and modifications may be made therein, without departure from this invention; and it is aimed in the appended claims to cover all such changes and modifications as fall within the true spirit and scope of the invention.

What we claim as new and desire to secure by Letters Patent of the United States is:

1. A system for determining the position of a source of radiating energy comprising, first and second stations physically separated from one another by a determinable distance and each receptive of said energy, said first station redirecting its received energy to said second station, first means at said second station for determining the direction of origin of any energy received thereat with respect to a line connecting first and second stations, second means at said second station for measuring the difference in path length between energy from said source that arrives at said second station via said first station and energy that arrives at said second station directly from said source, and third means at said second station receptive of information from said second means indicating said difference in path length, also receptive of, information indicating the distance between said stations, and also receptive of information from said first means indicating the angle between a line joining said stations and a line between said source and said second station, for computing the distance to said source from said second station.

2. A system for determining the position of a source of radiating energy comprising, first and second stations physically separated from one another by a distance $R_M$ and each receptive of said energy, said first station redirecting its received energy to said second station along a direct path equal to $R_M$, first means at said second station for determining the direction of origin of any energy received thereat, second means at said second station for measuring the difference in path length D between energy from said source that travels a path $r$ to said first station and then arrives at said second station via said first station and energy that arrives at said second station directly from said source along a path equal to $R_T$, where $D=(R_M+r)-R_T$, and third means at said second station and receptive of information indicating said difference in path length D from said second means, information indicating the distance $R_M$ between said stations, and information from said first means indicating the angle $\theta$ between $R_M$ and $R_T$, for computing the range to said source from said second station substantially in accordance with the formula $$R_T = \frac{D(R_M - D/2)}{D - R_M(1 - \cos \theta)}$$

3. A system for determining the position of a source of radiating jamming energy comprising, first and second stations physically separated from one another by a distance $R_M$ and each receptive of said jamming energy, said first station redirecting its received jamming energy to said second station along a direct path equal to $R_M$, first means at said second station for determining the direction of origin of any energy received thereat, second means at said second station for measuring the difference in path length D between jamming energy from said source that travels a path $r$ to said first station and then arrives at said second station via said first station and jamming energy that arrives at said second station directly from said source along a path equal to $R_T$, where $$D=(R_M+r)-R_T$$

and third means at said second station and receptive of information indicating said difference in path length D from said second means, information indicating the distance $R_M$ between said stations, and information from said first means indicating the angle $\theta$ between $R_M$ and $R_T$, for computing the range to said source of jamming energy from said second station substantially in accordance with the formula $$R_T = \frac{D(R_M - D/2)}{D - R_M(1 - \cos \theta)}$$

4. A system for determining the position of a source of radiating jamming energy comprising, first and second stations physically separated from one another by a determinable distance and each receptive of said energy, said first station redirecting its received jamming energy to said second station, first means at said second station for determining the direction of origin of any energy received thereat, second means at said second station for measuring the difference in path length between energy from said source that arrives at said second station via said first station and energy that arrives at said second station directly from said source, said second means determining said difference by multiplying the energy received from both paths together to develop a product signal and so delaying the energy from one of these paths until the average value of said product signal, over a predetermined time interval, is a maximum, the delay time required being directly proportional to said difference, and third means at said second station and receptive of information from said second means indicating said difference in path length, information indicating the distance between said stations, and information from said first means indicating the angle between a line joining said stations and a line between said source and said second station, for computing the range to said source of jamming energy from said second station.

5. A system for determining the position of a source of radiating energy comprising, first and second stations physically separated from one another by a distance $R_M$ and each receptive of said energy, said first station redirecting its received energy to said second station along a direct path equal to $R_M$, first means at said second station for determining the direction of origin of any energy received thereat, second means at said second station for measuring the difference in path length D between energy from said source that travels a path $r$ to said first station and then arrives at said second station via said first station and energy that arrives at said second station directly from said source along a path equal to $R_T$ where $$D=(R_M+r)-R_T$$

said second means determining D by multiplying the energy received from path $R_M+r$ by that received from path $R_T$ to develop a product signal and so delaying the energy from one of these paths until the value of said product signal is a maximum, so that the delay time required is directly proportional to D, and third means at said second station and receptive of information from said second means indicating said difference in path length D, also receptive of information indicating the value of the distance $R_M$ between said stations, and also receptive of information from said first means indicating the value of the angle $\theta$ between $R_M$ and $R_T$, for computing the range to said source of energy from said second station substantially in accordance with the formula $$R_T=\frac{D(R_M-D/2)}{D-R_M(1-\cos\theta)}$$

6. A system for determining the position of a source of radiating jamming energy comprising, first and second stations physically separated from one another by a distance $R_M$ and each receptive of said jamming energy, said first station redirecting its received jamming energy to second station along a direct path equal to $R_M$, first means at said second station for determining the direction of origin of any energy received thereat, second means at said second station for measuring the difference in path length D between jamming energy from said source that travels a path $r$ to said first station and then arrives at said second station via said first station and jamming energy that arrives at said second station directly from said source along a path equal to $R_T$, where $$D=(R_M+r)-R_T$$

said second means determining D by multiplying the jamming energy received from path $R_M+r$ by that received from path $R_T$ and so delaying the energy from one of these paths until the sum of the products of energies is a maximum, the delay time required being directly proportional to D, and third means at said second station and receptive of information indicating said difference in path length D from said second means, the distance $R_M$ between said stations, and the angle $\theta$ between $R_M$ and $R_T$ from said first means for computing the range to said source of jamming energy from second station in accordance with the formula $$R_T=\frac{D(R_M-D/2)}{D-R_M(1-\cos\theta)}$$

7. A system as set forth in claim 6, wherein said second means at said second station comprises, recording means for recording energy from each of the two paths, correlator means for multiplying the energy received from one path by that received by the other to produce a product signal and delay means for delaying the energy input to said correlator means from one path relative to that of the other until the product signal from said correlator means is a maximum.

8. A system as set forth in claim 7, wherein said second means further includes means for impressing timing signals upon said recording means, and means utilizing said timing signals to determine the amount of the time delay D that said delay means introduced in order to produce a maximum output from said correlator means.

9. A system as set forth in claim 8, wherein said first means at said second station comprises directional radar means for impressing energy from path $R_T$ upon said recording means, and said second means includes omni-directional means for receiving energy from said first station and impressing it upon said recording means.

10. A system for determining the position of a source of radiating jamming energy comprising, first and second stations physically separated from one another by a distance $R_M$ and each receptive of said jamming energy, said first station redirecting its received jamming energy to said second station along a direct path equal to $R_M$, radar means at said second station for determining the direction of origin of any energy received thereat and including a rotatable directional antenna, auxiliary means at said second station for receiving energy from said first station and including an omni-directional antenna, magnetic recording means for recording the outputs from said radar means and said auxiliary means on respective channels, timing reference means for impressing timing signals upon said magnetic recording means in conjunction with the information recorded thereon on each channel, a pair of pick-up means respectively associated with the respective channels on said recording means for translating said energy, said pick-up means being adjustable relative to one another along their channels so that the information in their channels that they translate may be variably delayed in time, correlator means coupled to the signal outputs from both said pick-up means for multiplying the corresponding portions of both channels together and then adding their products, counter means associated with both said pick-up means and connected to said correlator means for producing an output which is directly proportional to the time difference by which the pick-up heads were adjusted to produce a maximum output from said correlator, said time difference being directly proportional to the difference in path length D between jamming energy from said source that travels a path $r$ to said first station and then arrives at said second station via said first station and jamming energy that arrives at said second station directly from said source along a path equal to $R_T$, where $$D=(R_M+r)-R_T$$

and computer means at said second station and receptive of the output D from said counter means, information indicating the distance $R_M$ between said stations, and information indicating the angle $\theta$ between $R_M$ and $R_T$ from said radar means, for computing the range to said source of jamming energy from said second station in accordance with the formula $$R_T=\frac{D(R_M-D/2)}{D-R_M(1-\cos\theta)}$$

11. A system for determining the value of the distances between a first point of position and a second point of position, comprising in combination: means for developing a first data signal representing the angular displacement between first and second lines of reference, said first line of reference being defined along a path directly connecting said first and second points of position, while said second line of reference is defined along a path connecting said second point of position with a third point of position, said third point of position being displaced from said first line of reference; means for developing a second data signal representing the distance between said third point of position and said second point of position; means for developing a third data signal representing the difference between a first and a second reference distance values, said first reference distance value being defined as the distance between said first and second points of position along said first line of reference, while said second reference distance value is defined as the sum of the distance along a direct line from said first point of position to said third point of position plus the distance along said second line of reference from said third point of position to said first point of position; and electrically responsive computer apparatus, responsive to said first, second, and third data signals for combining said signals substantially in accordance with the formula, $$R_T = \frac{D(R_M - E/2)}{D - R_M(1 - \cos\theta)}$$

(where D is a representation of the value of said third reference signal, $R_S$ is a representation of the value of said second data signal and $\theta$ is a representation of the value of said first data signal) to develop a computer output signal representing the value of distance $R_T$ between said first and second points of position.

12. In a signal correlation system suitable for determining the timing relation between a first and second electrical signals having mutually coherent components, the combination of: means for separately recording samples of said first and second signals on at least a single closed loop recording medium; means developing a reference signal having a periodically recurrent component; means coupled with said recording means and said reference signal developing means for recording respective versions of said reference signal in association with each of said samples; separate playback means operative upon said recording means and movably positionable with respect to one another to produce separate played back versions of said samples and reference signal, the timing relation between said versions being controllable by the positioning of said playback means; signal correlation means responsive to the separate playback versions of said samples to develop a correlation signal the amplitude of which is representative of the degree to which the coherent components of the played back samples are coincident in time; and means including counter apparatus responsive to the played back versions of said reference signal for developing a time indicating signal representing the time displacement of said played back samples for any given value of correlation signal.

13. In a signal correlation system in which versions of two correlatable signals are recorded for separate playback on a controllable time displaced basis, the combination of: a source of reference signal having a periodically recurrent component; means for recording two versions of said reference signal each in association with and during the recording of a different one of said correlatable signals; means including electrical counter apparatus responsive to the two recorded versions of said reference signal during playback of said correlatable signals, to develop an output signal representing the effective time displacement between played back versions of said two correlatable signals.

References Cited by the Examiner

UNITED STATES PATENTS

| | | | |
|---|---|---|---|
| 2,166,991 | 7/39 | Guanella | 343—115 |
| 2,746,034 | 5/56 | Hasbrook | 343—15 |

CHESTER L. JUSTUS, *Primary Examiner.*

NORMAN H. EVANS, FREDERICK M. STRADER,
*Examiners.*